Figure 1:
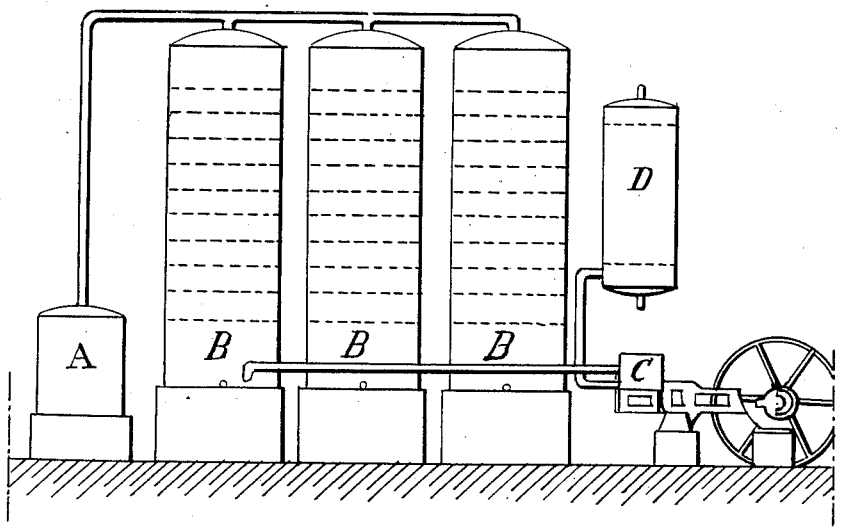

Oct. 30, 1928.

P. MORO 1,689,958

PROCESS OF MANUFACTURE OF CELLULOSE XANTHATE

Filed March 18, 1926

INVENTOR:
Pierre Moro
BY: Reegs, Boyce & Bakelas
ATTORNEYS

Patented Oct. 30, 1928.

1,689,958

UNITED STATES PATENT OFFICE.

PIERRE MORO, OF MARSEILLE, FRANCE.

PROCESS OF MANUFACTURE OF CELLULOSE XANTHATE.

Application filed March 18, 1926, Serial No. 95,670, and in France March 31, 1925.

The object of the invention is an improved process of manufacture of cellulose xanthate, known under the name of "viscose", which is used as a substitute for silk, after having been rendered suitable for spinning.

To manufacture "viscose" the carbon bisulphide is mixed at ordinary temperature with alkalicellulose, compressed, until for every 100 parts of cellulose employed, 300 parts of alkalicellulose are obtained and then reduced to small fragments. As the carbon bisulphide acts more on the exterior parts, mixtures of different composition are obtained, containing more or less carbon bisulphide. After leaving it sufficiently long, the mixture is dissolved in water and left to mature for several days at ordinary temperature. It is especially during this long period, that by-products are formed, on account of the existing excess of caustic soda and carbon bisulphide, which products must be eliminated from the solution, to render it suitable for spinning.

The process which forms the subject-matter of the present invention permits reducing considerably the quantity of carbon bisulphide, as well as the length of the treatment, and makes it possible to use less alkali and to obtain more rapidly a homogeneous solution of "viscose", suitable for spinning without purification.

It has been found, that instead of using pure carbon-bisulphide, a perfect result could be obtained, by using a high-grade solution of sulphur in carbon bisulphide and operating for example in the following manner: The alkalicellulose is prepared as usual and separated through pressure from the excess of caustic soda, so as to obtain about 225–250 parts for every 100 parts of cellulose employed. The product is reduced to very small fragments and mixed in a closed mixing-machine with double walls, heated to about 30°–40° C. with a quantity of the solution of sulphur in carbon bisulphide, varying from 15 to 25 parts (for every 100 parts of cellulose, calculated as being dry). The mass is mixed for some hours, until it appears to be homogeneous and left standing for 12–24 hours. It is afterwards dissolved by energetically stirring in water or in a weak solution of caustic soda and left standing for about 24 to 36 hours at a temperature varying from 25° to 30° C. The solution becomes homogeneous and after filtration and separation of the air, is generally suitable for spinning, on account of the small quantity of impurities it contains.

The alkalicellulose thus prepared can also be spread in layers of about 5 to 10 centimeters thickness on sieves, placed one over the other, in a number of towers, through which during several hours vapours of carbon bisulphide, enriched with sulphur, are sucked through an air pump, which is used after the operation, to eliminate the excess of carbon bisulphide from the mass. The solution thus prepared can also be atomized, at a pressure of 5 to 6 atmospheres and so reduced into a fine spray, at the upper part of the towers, which in this case will be heated to about 40°–45° C. The atomized solution is at the same time sucked by means of the air pump through the layers of alkalicellulose. The action is rapid and in both cases a spongy mass of homogeneous composition is obtained, which no longer contains any excess of carbon bisulphide. After standing for 12–24 hours, the mass is dissolved in water or in a weak solution of caustic soda and left about 24–36 hours at 25°–30° C. After filtration and separation of the air, the solution is generally ready for spinning.

Figure 2:
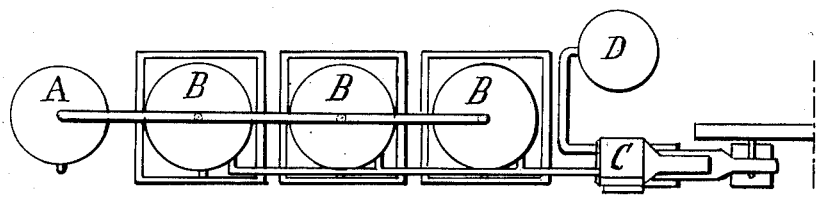

This disposition is shown on the accompanying drawing, in which Fig. 1 illustrates schematically in elevation the general arrangement, whereas Fig. 2 is a view of the horizontal view of the device shown in Fig. 1. On this drawing, A is a tank containing carbon bisulphide, B the square reaction towers loaded with the sieves containing the alkali cellulose, through which is sucked the enriched carbon bisulphide, C the air pump and D the condenser.

The towers B communicate on one side with the tank A containing the solution of sulphur in carbon bisulphide and on the other side with an air pump C and the condenser D.

This process is economical, as it requires less caustic soda; it enables further, considerable reduction in the quantity of carbon bisulphide to be used, by partly substituting it with sulphur, which is more economical; accelerates the treatment and generally obtains directly a solution suitable for spinning, without further purification, on account of its greater purity.

Claims:

1. The process of manufacturing cellulose xanthate which consists in compressing alkali cellulose thereby to obtain less than 300 parts for each 100 parts of cellulose, reducing the product to very small particles, and mixing the same with a high-grade solution of sulphur in carbon bisulphide while heating it to a temperature of 30° to 40° C.

2. The process of manufacturing cellulose xanthate which consists in compressing alkali cellulose thereby to obtain less than 300 parts for each 100 parts of cellulose, reducing the product to very small particles, spreading the same in layers superposed one above another, and causing vapors of a solution of sulphur in carbon bisulphide to pass through said layers, while heating the same to a temperature of 30° to 40° C.

3. The process of manufacturing cellulose xanthate which consists in compressing alkali cellulose thereby to obtain less than 300 parts for each 100 parts of cellulose, reducing the product to very small particles, spreading the same in thin layers supported one above another in a closed vessel, passing a finely atomized solution of sulphur in carbon bisulphide through said layers, while heating the enclosing vessel.

4. The process of manufacturing cellulose xanthate which consists in subjecting alkali cellulose to the action of a solution of sulphur in carbon bisulphide, permitting the resulting mass to stand for 12 to 24 hours, dissolving the same, maintaining the solution at a temperature of 25° to 30° C. for a period of 24 to 36 hours, filtering the solution and separating the air therefrom.

In testimony whereof I have signed my name to this specification.

MORO, PIERRE.